United States Patent
Mehta et al.

(10) Patent No.: US 7,814,050 B2
(45) Date of Patent: Oct. 12, 2010

(54) DISASTER RECOVERY

(75) Inventors: Rahul Mehta, Houston, TX (US); Hans Glitsch, Houston, TX (US); Paul Place, Houston, TX (US); Steve Van Horn, Baytown, TX (US)

(73) Assignee: Brocade Communications Systems, Inc., San Jose, CA (US)

( * ) Notice: Subject to any disclaimer, the term of this patent is extended or adjusted under 35 U.S.C. 154(b) by 650 days.

(21) Appl. No.: 10/277,431

(22) Filed: Oct. 22, 2002

(65) Prior Publication Data

US 2004/0078397 A1   Apr. 22, 2004

(51) Int. Cl.
G06F 17/30 (2006.01)

(52) U.S. Cl. .................. 707/609; 707/610; 711/147; 711/151; 711/158; 726/27

(58) Field of Classification Search .......... 707/1–2, 707/104.1, 609–610; 714/1–4, 10, 100; 711/147, 711/151, 158
See application file for complete search history.

(56) References Cited

U.S. PATENT DOCUMENTS

| | | | | |
|---|---|---|---|---|
| 5,822,531 A * | 10/1998 | Gorczyca et al. | ............ | 709/221 |
| 5,935,234 A * | 8/1999 | Arimilli et al. | ............. | 710/244 |
| 5,961,650 A * | 10/1999 | Arendt et al. | ................ | 714/2 |
| 6,044,367 A * | 3/2000 | Wolff | ............................ | 707/2 |
| 6,144,999 A * | 11/2000 | Khalidi et al. | .............. | 709/219 |
| 6,249,883 B1 * | 6/2001 | Cassidy et al. | ................ | 714/42 |
| 6,389,427 B1 * | 5/2002 | Faulkner | .................. | 707/104.1 |
| 6,397,292 B1 * | 5/2002 | Venkatesh et al. | ........... | 711/114 |
| 6,671,704 B1 * | 12/2003 | Sripada et al. | ............. | 707/204 |
| 6,999,998 B2 * | 2/2006 | Russell | ...................... | 709/213 |
| 7,185,364 B2 * | 2/2007 | Knouse et al. | ................. | 726/8 |
| 2002/0069369 A1 * | 6/2002 | Tremain | ..................... | 713/201 |
| 2002/0073354 A1 * | 6/2002 | Schroiff et al. | ................. | 714/4 |
| 2002/0112185 A1 * | 8/2002 | Hodges | ..................... | 713/201 |
| 2002/0116642 A1 * | 8/2002 | Joshi et al. | ................... | 713/201 |
| 2002/0156613 A1 * | 10/2002 | Geng et al. | ................... | 703/23 |
| 2004/0073831 A1 * | 4/2004 | Yanai et al. | .................... | 714/7 |
| 2006/0112154 A1 * | 5/2006 | Douceur et al. | ............. | 707/204 |

* cited by examiner

*Primary Examiner*—Don Wong
*Assistant Examiner*—Hanh B Thai
(74) *Attorney, Agent, or Firm*—Wong, Cabello, Lutsch, Rutherford & Brucculeri, LLP

(57) ABSTRACT

File system disaster recovery techniques provide automated monitoring, failure detection and multi-step failover from a primary designated target to one of a designated group of secondary designated targets. Secondary designated targets may be prioritized so that failover occurs in a prescribed sequence. Replication of information between the primary designated target and the secondary designated targets allows failover in a manner that maximizes continuity of operation. In addition, user-specified actions may be initiated on failure detection and/or on failover operations and/or on failback operations.

49 Claims, 2 Drawing Sheets

DISASTER RECOVERY

BACKGROUND

The invention relates generally to computer network data management facilities and, more particularly, to disaster recovery techniques for use therein.

Many large organizations manage the storage and access of their data through the use of multiple file servers. For example, a corporation may utilize one or more servers to store/manage the data and/or applications for each of its operating units or divisions. As a result, each operating unit (e.g., engineering, sales, marketing) has ready access to their data and applications. However, the use of multiple servers also increases the difficulty individual users have in locating the data they want or need. For example, if an individual assigned to the engineering division needs to review product marketing or sales information they must know what server and the location on that server where the desired information is stored. It will be appreciated that the difficulty of locating information in this manner increases as the size of the organization grows—that is, as the number of servers increases.

Partly in response to this problem, Distributed File System (DFS) technology has been developed that allows a user (typically a network administrator) to logically associate a single directory structure whose contents can span a number of file servers and file shares (e.g., directories), making it easy to browse the network to find the data and files needed. As would be known to one of ordinary skill in the art, DFS allows an administrator to map logical names (e.g., "Marketing") with one or more shared resources such as, for example, the marketing material for each product or division within a business regardless of where that data may be physically stored.

While DFS technology has simplified the task of managing network resources (e.g., hardware devices and files), it does not provide any means to identify and recover from the failure of a network resource while providing near continuous access to the underlying data. Accordingly, it would be beneficial to provide a mechanism to detect and recover from the failure of shared network resources.

SUMMARY

In one embodiment the invention provides a disaster recovery method. The method includes monitoring one or more designated resources, detecting when one of the designated resources fails, identifying a designated alternate resource associated with the failed resource and swapping the designated alternate resource for the failed resource. In some embodiments, multiple alternate resources may be designated for a given (primary) resource such that one of the alternate resources is selected in accordance with a priority scheme when the primary resource fails. Methods in accordance with the invention may be embodied in computer executable instructions and stored in a suitable storage medium.

In another embodiment, the invention provides a disaster recovery system. Such a system typically includes a plurality of logical resources, each logical resource associated with a physical resource, a logical namespace means for routing requests directed to a designated logical resource to an associated physical resource, a monitor means for actively monitoring one or more of the physical resources and a recovery means for receiving notification from the monitor means that a physical resource has failed and causing the logical namespace means to substitute a designated alternate physical resource for the failed physical resource.

DETAILED DESCRIPTION

The invention relates generally to computer network data management facilities and, more particularly but not by way of limitation, to methods and devices for responding to, and recovering from, the failure of shared network resources. The following embodiments of the invention, described in terms of an application program executing in a Microsoft® Windows® network environment using Distributed File System (DFS) technology, are illustrative only and are not to be considered limiting in any respect.

Figure 1:
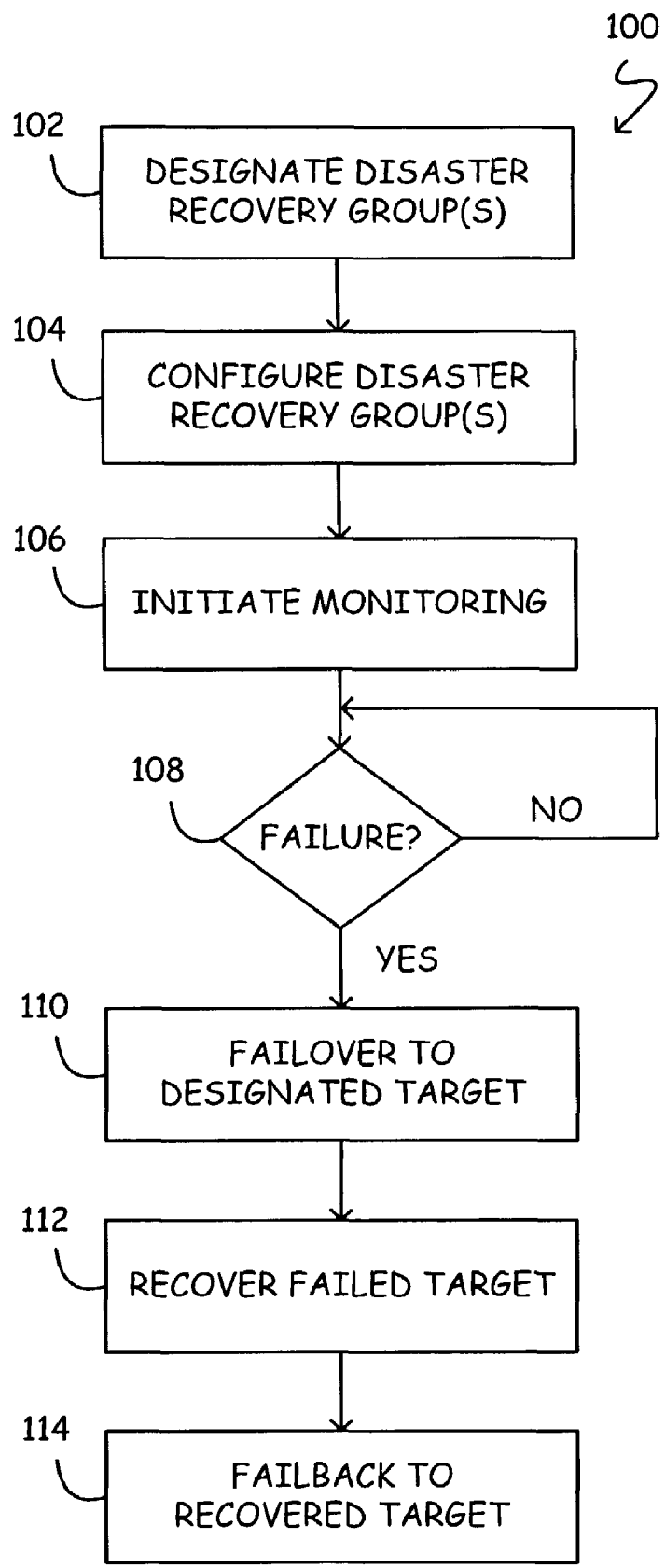
FIG. 1 shows, in flowchart form, a disaster recovery process in accordance with one embodiment of the invention.

Referring to FIG. 1, disaster recovery (DR) process 100 in accordance with one embodiment of the invention begins when a user (typically a network administrator) designates resources/targets as members of one or more DR groups (block 102). Group designation may, for example, be effected through a graphical interactive user interface, a batch input file, or a series of command line inputs. To enable DR process 100 to provide automatic failover (see discussion below regarding block 110) and, possibly, failback (see discussion below regarding block 114) capability, it will be recognized that each DR group resource (hereinafter referred to as a "primary resource") must be associated with at least one alternate resource (hereinafter referred to as a "secondary resources"). During failover operations, one of the designated secondary resources may be "substituted" for the failed primary resource. In accordance with one embodiment of the invention, alternate resources may be designated through the DFS "link replica" feature. Typically, primary resources are on high-performance devices such as high speed magnetic storage units to provide the best response to run-time users. Secondary resources, however, may use lower performance (and therefore lower cost) devices as they are only accessed by users in the event of a failure.

Once defined, each DR group is configured for run-time operation (block 104). By way of example, a user may use a graphical user interface to configure the following operational features for each DR group resource:

Monitor Interval: The time between successive determinations of a target's health. For example, primary resources may be checked every ten (10) minutes while secondary resources may be checked every twenty (20) minutes to determine if they have failed. It is noted, these time are illustrative only and, in one embodiment, may be set from one (1) minute to once per day. It is further noted that secondary resources do not need to be checked until, or unless, the associated primary resource fails.

Replication: In some embodiments, it may be beneficial for DR process 100 to periodically replicate the data associated with a primary resource into one or more of the primary resource's associated secondary targets. If replication is provided by DR process 100, the user may additionally designate the time interval between successive replications or synchronizations. In some embodiments, DR process 100 ensures that the content of the secondary resource is identical to that of the primary resource— within the designated replication interval. In other embodiments, DR process 100 only ensures that the primary resource's data is contained within the secondary resource, allowing the secondary resource to have additional data contents. It is noted that replication via DR process 100 is not required. For example, a primary resource could be one disk in a hardware mirrored disk system while the secondary resource could be another disk in the hardware mirrored disk system. In such a system, DR process 100 would not have to perform replication to ensure continued user access to the underlying data in the event of a failure. In still other embodiments, the user may not care if a primary resource's data is replicated—being content to simply allow access to a secondary resource should the primary resource go off-line.

Failover Sequence: If a primary resource has more than one associated secondary resource, the user may designate in which order the secondary resources are made accessible in the event of a failure. For example, if three (3) secondary resources (SR1, SR2 and SR3) are associated with a primary resource, the user may designate that SR1 be used if the primary resource fails, that SR3 should be used if SR1 fails, and that SR2 should be used if SR3 fails. In this manner, DR process 100 provides and accommodates chained failures. In some embodiments, the failover sequence may be "locked" as described above. In other embodiments, if replication is provided via DR process 100, the failover sequence may be to the "most recently replicated" secondary target.

Referring again to FIG. 1, once configured DR process 100 may be started so that each designated resource/target is monitored in accordance with the user-specified schedule (block 106). In one embodiment, DR process 100 issues a "ping" command to each machine on which a monitored target/resource exists to determine if the resource's associated computer is operational. In another embodiment, DR process 100 issues a directory request to each monitored target/resource. If a proper response is returned by the targeted resource, the resource is deemed to be operational (invoking the 'no' prong of diamond 108). If a proper response is not returned, the targeted resource is deemed to have failed (invoking the 'yes' prong of diamond 108). For example, in one embodiment a Microsoft® Windows® API (Application Program Interface) directory listing call is made to the target directory (physical resource) and the returned response is analyzed.

On failure detection, DR process 100 causes the computer network's DFS tables to be updated so that further accesses directed to the failed resource/target are directed instead to one of the failed resource's associated secondary targets—that is, failover to a secondary resource is effected (block 110). DFS table updates may be performed, for example, using standard DFS application programming interface (API) defined instructions. As indicated above, in some embodiments the sequence of secondary resources to fail to may be designated by the user—e.g., secondary resource 1, followed by secondary resource 2. In other embodiments, the failover sequence may include failing over to the most recently replicated secondary resource. In one embodiment, the mechanics of updating the computer network's DFS tables is as follows: (1) update the DFS tables to indicate the link to the failed resource is "off-line;" and (2) update the DFS tables to indicate the link to the selected secondary resource is "on-line." Those of ordinary skill in the art will recognize that an off-line link is a link that is not used to resolve access requests by DFS while an on-line link is used to resolve access requests by DFS. In still other embodiments, DR process 100 may invoke user-specified routines immediately before and/or immediately after effecting the failover operation (i.e., DFS table update operation). One function such user-specified routines may perform is to generate failure email messages to designated staff. Another function user-specified routines may perform is to generate network monitor log entries indicating the failure. Such log events may include date and time stamps as well as the identification of the failed resource. Typically user-specified routines are effected through executable scripts and may, accordingly, perform any task that is possible through such means. Identification and selection of these routines may be made during DR group configuration (block 104).

In some embodiments, DR process 100 may be further adapted to determine if the detected failure can be corrected and, if so, perform the correction (block 112) and then return the repaired resource to operation (block 114). For example, if the failure was due to a parity error, DR process 100 may correct the error or invoke another application or process to correct the error. Alternatively, if the failure is due to hardware and/or is repaired by an outside agency (process or person), DR process 100 may be notified when the target's device is ready to return to service. However the failure is addressed, once corrected the primary resource may be synchronized with the on-line secondary resource (to capture any data modifications made while the primary resource was off-line) and returned to service through DFS table updates analogous to those described above in block 110.

Figure 2:
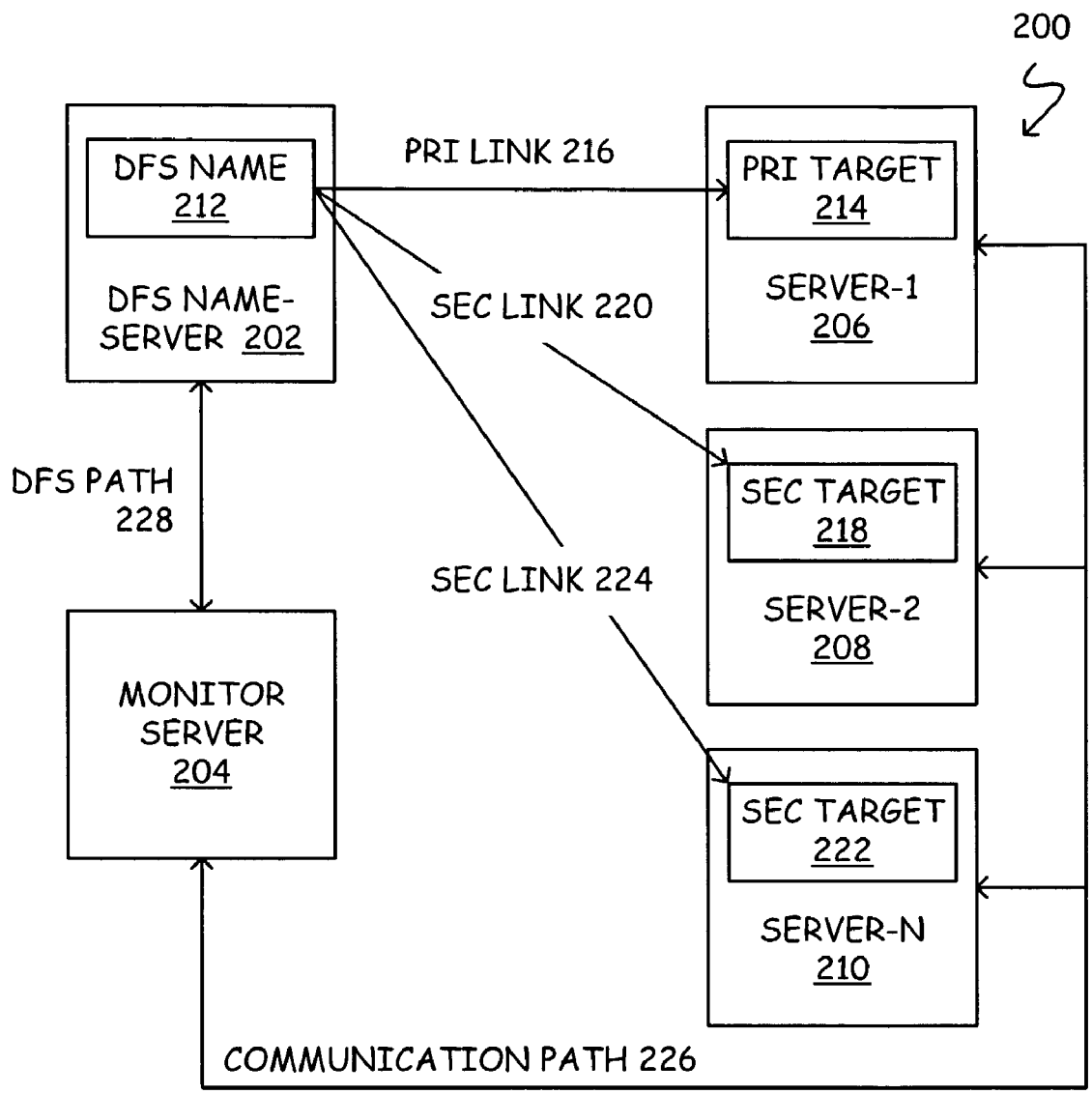
FIG. 2 shows, in block diagram form, a computer network monitored in accordance with one embodiment of the invention.

Referring to FIG. 2, computer network 200 in accordance with one embodiment of the invention comprises DFS Nameserver 202, Monitor Server 204, Server-1 206, Server-2 208 and Server-3 210. As shown, DFS Name 212 identifies Primary Target/Resource 214 via Primary Link 216. Associated with DFS Name 212 are two secondary targets ("link replicas" in DFS terminology): Secondary Target 218 (identified via Secondary Link 220) and Secondary Target 222 (identified via Secondary Link 222). Monitor Server 204 periodically monitors Primary Target 214 and, possibly, one or more of the Secondary Targets 218 and 222 in accordance with a user specified configuration (see discussion above). If Monitor Server 204 determines that Primary Target 214 has failed (i.e., is non-responsive to a query from Monitor Server 204 via Communication Path 226), Monitor Server 204 may effect the failover operations of block 110 (see FIG. 1) by way of standard DFS API instructions and DFS Path 228. Alternatively, DR process 100 may include a DR module (not shown in FIG. 2) that executes on DFS Nameserver 202. In this embodiment, Monitor Server 204 indicates to the DR module that Primary Target 214 has failed and it is the DR module that effects failover operations (block 110 of FIG. 1), failback operations (block 114 of FIG. 1) and, possibly, the DFS actions associated with recovery operations (block 112 of FIG. 1) by direct communication with DFS Nameserver 202 through, typically, DFS API instructions.

One consequence of a method and system in accordance with the invention is that a client (not shown in FIG. 2) using DFS Nameserver 202 to communicate or access data on a server (e.g., Primary Target 214 on Server-1 206) is not blocked when the primary target fails as the inventive method and system can automatically failover to a designated secondary target (e.g., Secondary Target 218 on Server-2 208). That is, the client may never know of the failure because a secondary link (e.g., Secondary Link 220) is automatically and transparently substituted for the link to the failed primary target (e.g., Primary Target 214). Accordingly, disaster recover in accordance with the invention provides clients (users and/or applications) near continuous access to data through an automatic and transparent failover process. Similarly, when a failed resource is recovered (or replaced), methods and systems in accordance with the invention provide continued access to the data through link substitution techniques.

Figure 3:
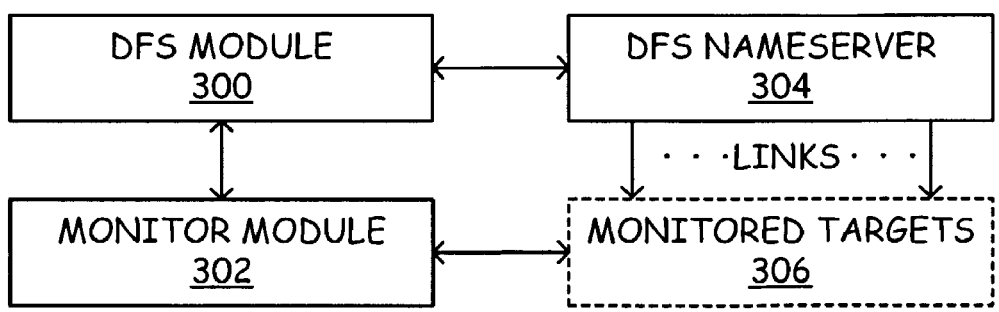
FIG. 3 shows, in block diagram form, a functional view of a disaster recovery process in accordance with one embodiment of the invention.

Referring to FIG. 3, a functional block diagram of DR process 100 in accordance with one embodiment of the invention comprises Monitor Module 300 and DFS Module 302. DFS Module 300 communicates with one or more DFS Nameservers 304 and with Monitor Module 302. Similarly, Monitor Module communicates with Monitored Targets 306 and with DFS Module 300. In some embodiments, DFS Module 300 and Monitor Module 302 execute on the same processor (e.g., computer system processor). In other embodiments, DFS Module 300 executes on the same platform as does DFS Nameserver 304. In most embodiments, Monitor Module 302 and DFS Nameserver 304 are executed on different platforms for fault tolerance reasons.

One benefit of disaster recovery processes in accordance with the invention is that an automated means for monitoring the status of a logical namespace (e.g., DFS) and the automated failover to alternate target resources on failure detection is provided. Another benefit in accordance with the invention is that a plurality of alternate targets may be designated as failover resources, thereby providing a means to accommodate a series of resource failures in the namespace. Yet another benefit of the invention is that if multiple failover targets are identified, a user-specified priority scheme may be used to direct the failover operation. Still another benefit of the invention is that data replication may be associated with one or more alternate targets to provide data redundancy within the namespace itself. Another benefit of the invention is that target/resource monitoring may be effected by a direct query to the resource itself (e.g., a directory request). This approach to monitoring status has the benefit of determining if a precise resource if functional (e.g., a directory structure in a file system) rather than relying on the health of a hardware device (e.g., a network interface card, NIC) and inferring that the file system accessible through that NIC is operational.

Various changes in the details of the illustrated operational method are possible without departing from the scope of the following claims. For instance, the act of failed target recovery (block 112 of FIG. 1) need not be implemented, or even possible, in all embodiments. For example, when hardware (e.g., a magnetic storage disk, central processor unit, or network router) fails, automated recovery is generally not an option. In these cases manual repair/replacement of the failed device is needed to effect recovery. Similarly, the act of automated failback operations (block 114 of FIG. 1) may not be implemented in all embodiments. In addition, the automated monitoring, failover and failback operations described herein with respect to a DFS embodiment are equally applicable to any network system that provides, or can be made to provide, a logical namespace construct. By way of example, the inventive techniques are applicable in a Unix environment wherein the logical namespace is provided through a combination of the Network Information System (NIS), Network File System (NFS) and the Unix automount feature. (NIS and NFS were developed by Sun Microsystems, Inc. of Mountain View, Calif.)

It will also be recognized by those of ordinary skill in the art of computer programming that the method of FIG. 1 and the functional modules of FIG. 3 may be embodied as a series of instructions organized into one or more computer programs which are executable by a programmable control device. A programmable control device may be a single computer processor, a plurality of computer processors coupled by a communications link, or a custom designed state machine. Custom designed state machines may be embodied in a hardware device such as a printed circuit board comprising discrete logic, specially designed application specific integrated circuits (ASICs), or integrated circuits such as field programmable gate arrays (FPGAs). Storage devices suitable for tangibly embodying computer programs include all forms of non-volatile memory including, but not limited to: semiconductor memory devices such as electrically programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A logical namespace disaster recovery method, comprising:
    monitoring shared directories in a logical namespace;
    detecting an access failure to one of the monitored shared directories, the failed shared directory having at least two shared directories associated therewith and designated as alternate shared directories, each of the alternate shared directories having replicate of data associated with the failed shared directory;
    identifying the alternate shared directories associated with the failed shared directory;
    selecting one of the alternate shared directories in accordance with a specified priority scheme; and
    swapping the selected alternate shared directory for the failed shared directory.

2. The method of claim 1, wherein the act of monitoring comprises:
    issuing a command to a shared directory; and
    waiting for an appropriate response from the shared directory in response to the issued command.

3. The method of claim 2, wherein the act of issuing a command comprises issuing a directory listing command.

4. The method of claim 2, wherein the act of detecting comprises determining that an appropriate reply to the issued command was not received.

5. The method of claim 4, wherein the act of determining that an appropriate response to the issued command was not received comprises, not receiving a reply responsive to the issued command within a specified time period.

6. The method of claim 1, wherein the act of monitoring further comprises periodically replicating data associated with one or more of the monitored shared directories to a second storage location in the logical namespace.

7. The method of claim 1, wherein the act of monitoring further comprises periodically replicating data associated with one or more of the monitored shared directories to one or more alternate storage locations.

8. The method of claim 7, wherein the act of replicating data to one or more alternate storage locations comprises replicating data to storage locations identified by the alternate shared directories.

9. The method of claim 1, wherein the act of selecting in accordance with the specified priority scheme comprises selecting in accordance with a user-specified priority scheme.

10. The method of claim 9, wherein the act of selecting in accordance with a user-specified priority scheme comprises selecting the one alternate shared directory having the most recent replicate of data associated with the failed shared directory.

11. The method of claim 9, wherein the act of selecting in accordance with a user-specified priority scheme comprises selecting in accordance with a user-designated order.

12. The method of claim 9, further comprising:
correcting access to the failed shared directory;
synchronizing data of the corrected shared directory with data of the selected alternate shared directory; and
returning access to the corrected shared directory.

13. The method of claim 1, wherein the act of swapping comprises substituting the selected alternate shared directory for the failed shared directory so that a message directed to the failed shared directory is sent to the selected alternate shared directory in a manner transparent to a user issuing the command.

14. The method of claim 1, further comprising invoking a user-specified action after the act of detecting and before the act of swapping.

15. The method of claim 14, wherein the act of invoking a user-specified action comprises invoking a routine to record the detected failure in a log.

16. The method of claim 1, further comprising invoking a user-specified action after the act of swapping.

17. The method of claim 16, wherein the act of invoking a user-specified action comprises invoking a routine to record the act of swapping the selected shared directory for the failed shared directory.

18. The method of claim 1, wherein the logical namespace disaster recovery method comprises a distributed file system (DFS) disaster recovery method.

19. The method of claim 1, wherein the act of identifying comprises identifying a link replica associated with the failed shared directory.

20. A program storage device, readable by a programmable control device, comprising instructions stored on the program storage device for causing the programmable control device to:
monitor shared directories in a logical namespace;
detect an access failure to one of the monitored shared directories, the failed shared directory having at least two shared directories associated therewith and designated as alternate shared directories, each of the alternate shared directories having replicate of data associated with the failed shared directory;
identify the alternate shared directories associated with the failed shared directory;
select one of the alternate shared directories in accordance with a specified priority scheme; and
swap the selected alternate shared directory for the failed shared directory.

21. The program storage device of claim 20, wherein the instructions to monitor comprise instructions to:
issue a command to a shared directory; and
wait for an appropriate response from the shared directory in response to the issued command.

22. The program storage device of claim 21, wherein the instruction to issue a command comprises an instruction to issue a directory listing command.

23. The program storage device of claim 20, wherein the instructions to monitor further comprise instructions to periodically replicate data associated with one or more of the monitored shared directories to a second storage location.

24. The program storage device of claim 23, wherein the instructions to periodically replicate data to a second storage location comprise instructions to replicate data to a location identified by a designated alternate shared directory associated with the monitored shared directory.

25. The program storage device of claim 21, wherein the instructions to detect comprise instructions to determine that an appropriate reply to the issued command was not received.

26. The program storage device of claim 20, wherein the instructions to swap comprise instructions to substitute the selected alternate shared directory for the failed shared directory so that a message directed to the failed shared directory is sent to the selected alternate shared directory in a manner transparent to a user issuing the command.

27. The program storage device of claim 20, further comprising instructions to invoke a user-specified action after the instructions to detect and before the instructions to swap.

28. The program storage device of claim 20, further comprising instructions to invoke a user-specified action after the instructions to swap.

29. The program storage device of claim 20, wherein the instructions to select in accordance with the specified priority scheme comprises instructions to select in accordance with a user-specified priority scheme.

30. The program storage device of claim 29, wherein the instructions to select in accordance with a user-specified priority scheme comprises instructions to select the one alternate shared directory having the most recent replicate of data associated with the failed shared directory.

31. The program storage device of claim 29, wherein the instructions to select in accordance with a user-specified priority scheme comprises instructions to select in accordance with a user-designated order.

32. The program storage device of claim 20, wherein the instructions cause the programmable control device to:
correct access to the failed shared directory;
synchronize data of the corrected shared directory with data of the selected alternate shared directory; and
return access to the corrected shared directory.

33. A logical namespace disaster recovery system, comprising:
a plurality of logical shared directories, each logical shared directory associated with a physical shared directory;
logical namespace means for routing requests directed to a designated logical shared directory to an associated physical shared directory, said logical namespace means operatively coupled to each of the logical shared directories;
monitor means for actively monitoring the physical shared directories; and
recovery means for receiving notification from the monitor means that a physical shared directory has failed and causing the logical namespace means to:
identify at least two alternate physical shared directories associated with the failed physical shared directory, each of the alternate physical shared directories having replicate of data associated with the failed physical shared directory
select one of the alternate physical shared directories in accordance with a specified priority scheme, and
substitute the selected alternate physical shared directory for the failed physical shared directory.

34. The disaster recovery system of claim 33, wherein the logical namespace means comprises a distributed file system (DFS) logical namespace.

35. The disaster recovery system of claim 34, wherein the logical namespace means identifies a secondary physical shared directory through a DFS link-replica means.

36. The disaster recovery system of claim 35, wherein a designated primary physical shared directory is associated with a plurality of secondary physical shared directories.

37. The disaster recovery system of claim 34, wherein the recovery means for causing the logical namespace means to substitute a designated alternate physical shared directory for the failed physical shared directory comprises using DFS application programming interface (API) commands to:
  remove the failed physical shared directory from active use in the DFS; and
  using a designated alternate physical shared directory for the failed physical shared directory in the DFS.

38. The disaster recovery system of claim 33, wherein the monitor means comprises a means for issuing periodic queries to at least one of the physical shared directories to determine if the logical shared directory is operational.

39. The disaster recovery system of claim 38, wherein the means for issuing periodic queries comprises issuing directory listing queries.

40. The disaster recovery system of claim 33, wherein the recovery means selects the one designated alternate physical shared directory in accordance with a user-specified priority scheme.

41. The disaster recovery system of claim 40, wherein to select in accordance with a user-specified priority scheme, the recovery means causes the logical namespace means to select in accordance with a user-designated order.

42. The disaster recovery system of claim 40, wherein to select in accordance with a user-specified priority scheme, the recovery means causes the logical namespace means to select the one alternate shared directory having the most recent replicate of data associated with the failed shared directory.

43. The disaster recovery system of claim 33, further comprising an execution means for executing a user-specified action after the monitor means detects failure of a physical shared directory.

44. The disaster recovery system of claim 43, further comprising a second execution means for executing a second user-specified action after the recovery means causes the logical namespace means to substitute a designated alternate physical shared directory for the failed physical shared directory.

45. The disaster recovery system of claim 33, further comprising a replication means for replicating information associated with a first physical shared directory to a second physical shared directory.

46. The disaster recovery system of claim 45, wherein the replication means replicates information associated with the first physical shared directory to a plurality of secondary physical shared directories.

47. The disaster recovery system of claim 33, wherein the monitor means comprises a first computer executable module executing on a first computer system and the recovery means comprises a second computer executable module executing on a second, different, computer system.

48. The disaster recovery system of claim 33, wherein the logical namespace means and the disaster recovery means comprise separate computer executable modules executing on a common computer system.

49. The disaster recovery system of claim 33, wherein the recovery means causes the logical namespace means to:
  correct access to the failed shared directory,
  synchronize data of the corrected shared directory with data of the selected alternate shared directory, and
  return access to the corrected shared directory.

* * * * *